United States Patent
Fujikawa (10) Patent No.: US 6,268,763 B1
(45) Date of Patent: Jul. 31, 2001

(54) SEMICONDUCTOR INTEGRATED CIRCUIT DEVICE FOR DRIVING A MAGNETIC DISK APPARATUS

(75) Inventor: Akio Fujikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/249,120

(22) Filed: Feb. 12, 1999

(30) Foreign Application Priority Data

Feb. 13, 1998 (JP) .................................................. 10-030719
Feb. 13, 1998 (JP) .................................................. 10-030720

(51) Int. Cl.$^7$ ....................................................... G05F 1/10
(52) U.S. Cl. ........................ 327/538; 327/540; 327/541; 327/560; 327/562; 327/52; 327/56
(58) Field of Search ..................... 327/538, 540, 327/541, 542, 543, 560, 561, 562, 563, 51, 52, 53, 54, 56

(56) References Cited

U.S. PATENT DOCUMENTS

| | | | | |
|---|---|---|---|---|
| 4,263,519 | * | 4/1981 | Schade, Jr. ............................ | 327/513 |
| 4,317,054 | * | 2/1982 | Caruso et al. ........................ | 323/313 |
| 5,079,497 | * | 1/1992 | Barbu et al. .......................... | 323/281 |
| 5,578,960 | * | 11/1996 | Matsumura et al. .................. | 327/538 |
| 5,774,013 | * | 6/1998 | Gore ..................................... | 327/538 |

* cited by examiner

Primary Examiner—Timothy P. Callahan
Assistant Examiner—An T. Luu
(74) Attorney, Agent, or Firm—Arent Fox Kintner Plotkin & Kahn, PLLC (57) ABSTRACT

A semiconductor integrated circuit device for a magnetic disk apparatus has analog circuits such as a read/write circuit and digital circuits such as an interface driver circuit, a control circuit, and a stepping motor driver circuit, all of these circuits operating on a single supply voltage. The semiconductor integrated circuit device further has a voltage regulator whose output voltage is lower than the supply voltage and variable according to the voltage applied to an output voltage adjustment terminal. The control circuit operates on the output voltage of this regulator.

3 Claims, 9 Drawing Sheets

SEMICONDUCTOR INTEGRATED CIRCUIT DEVICE FOR DRIVING A MAGNETIC DISK APPARATUS

BACKGROUND OF THE INVENTION

1. Field of the Invention

The present invention relates to a magnetic disk apparatus for writing and reading data to and from a magnetic recording medium, and to a semiconductor integrated circuit device for use in such an apparatus.

2. Description of the Prior Art

An IC (integrated circuit) designed for use in an FDD (floppy disk drive) (hereafter such an IC will be referred to as an "FDD IC") incorporates analog circuits that handle analog signals, e.g. a read/write circuit for writing and reading data to and from a magnetic disk, as well as digital circuits that handle digital signals, e.g. various control circuits. In most cases, all of these circuits operate on a common supply voltage (typically 5 V). Operating all the circuits on a single supply voltage, however, causes the supply voltage to be contaminated, and thereby made to fluctuate, by the noise resulting from the operation of the digital circuits. This adversely affects the characteristics of the analog circuits. For this reason, in a conventional FDD IC, the circuits incorporated therein are individually provided with a supply voltage terminal to be connected to the supply voltage and a ground terminal to be grounded.

However, in an FDD IC, even if the circuits incorporated therein are individually provided with a supply voltage terminal and a ground terminal, they invariably need to be connected externally to a single supply voltage. This makes it difficult to sufficiently suppress the degradation of the characteristics of the analog circuits, in particular in cases where the analog circuits handle weak signals. Degradation of the characteristics of the analog circuits, more specifically degradation of the characteristics of the read/write circuit, means nothing but degradation of the accuracy with which the FDD apparatus as a whole writes and reads data to and from a magnetic disk.

Moreover, an FDD IC suffers from large current consumption exactly because all of the circuits incorporated therein operate on a common supply voltage.

Moreover, the manufacturing process of an FDD IC includes a high-temperature test that is conducted to check whether the IC operates normally under high temperature and thereby ensure its reliability. This high temperature test requires not only a high-temperature environment, and thus large-scale testing facilities and equipment, but also much time. Accordingly, an FDD IC tends to demand high testing costs, making the costs of the FDD IC as a whole, and thus the costs of the FDD apparatus employing it, unnecessarily high.

Moreover, it is inevitable that the MOS (metal-oxide semiconductor) transistors forming the digital circuits show a certain degree of variation in their performance. If a circuit happens to be composed of MOS transistors of relatively poor performance, the circuit will not offer the desired characteristics. Since there is no way to save such a circuit, it is not possible to achieve a satisfactory yield of an FDD IC. This makes the costs of the FDD IC, and thus the costs of the FDD apparatus employing it, even higher.

SUMMARY OF THE INVENTION

An object of the present invention is to provide an inexpensive, low-current-consumption semiconductor integrated circuit device that sufficiently suppresses the degradation of the characteristics of the analog circuits incorporated therein.

Another object of the present invention is to provide an inexpensive, low-current-consumption magnetic disk apparatus that improves the characteristics of the operations associated with the analog circuits incorporated therein.

To achieve the above objects, according to the present invention, in a semiconductor integrated circuit device having analog and digital circuits that operate on a single supply voltage, a regulator circuit is provided whose output voltage is variable and lower than the supply voltage so that the digital circuits operate on the output voltage of this regulator circuit.

According to this circuit configuration, the noise resulting from the operation of the digital circuits is shut off by the regulator, and is thus prevented from contaminating the supply voltage. This helps suppress variation of the voltage that is supplied to the analog circuits for their operation. In addition, the digital circuits operate on a voltage lower than the supply voltage. This helps achieve a reduction in current consumption.

Here, it is to be noted that digital circuits designed for control purposes are expected simply to make correct judgments between a high level and a low level. This means that they do not necessarily have to be operated on a predetermined voltage; that is, they may be operated on a lower voltage, as long as a certain voltage margin is secured to ensure correct judgment between a high level and a low level.

Operating a circuit composed of MOS devices at a voltage lower than its normal operation voltage is equivalent to operating it in a high-temperature environment. Accordingly, in cases where digital circuits composed of MOS devices are used, providing a regulator having an output voltage adjustment terminal so that it varies its output voltage according to the voltage applied to the output voltage adjustment terminal makes it possible to conduct a high-temperature test simply by adjusting the voltage applied to the output voltage adjustment terminal.

In some cases, a circuit that is composed of MOS devices of relatively poor performance and thus does not offer the desired characteristics can be made to offer the desired characteristics by raising its operation voltage. This means that, by raising the output voltage of the regulator, it is possible to save such a circuit. To achieve this, it is preferable that the regulator be, for example, so configured as to vary its output voltage depending on whether a predetermined operation has been performed on a predetermined device provided therein; this makes it possible to fix the output voltage of the regulator at a higher voltage.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
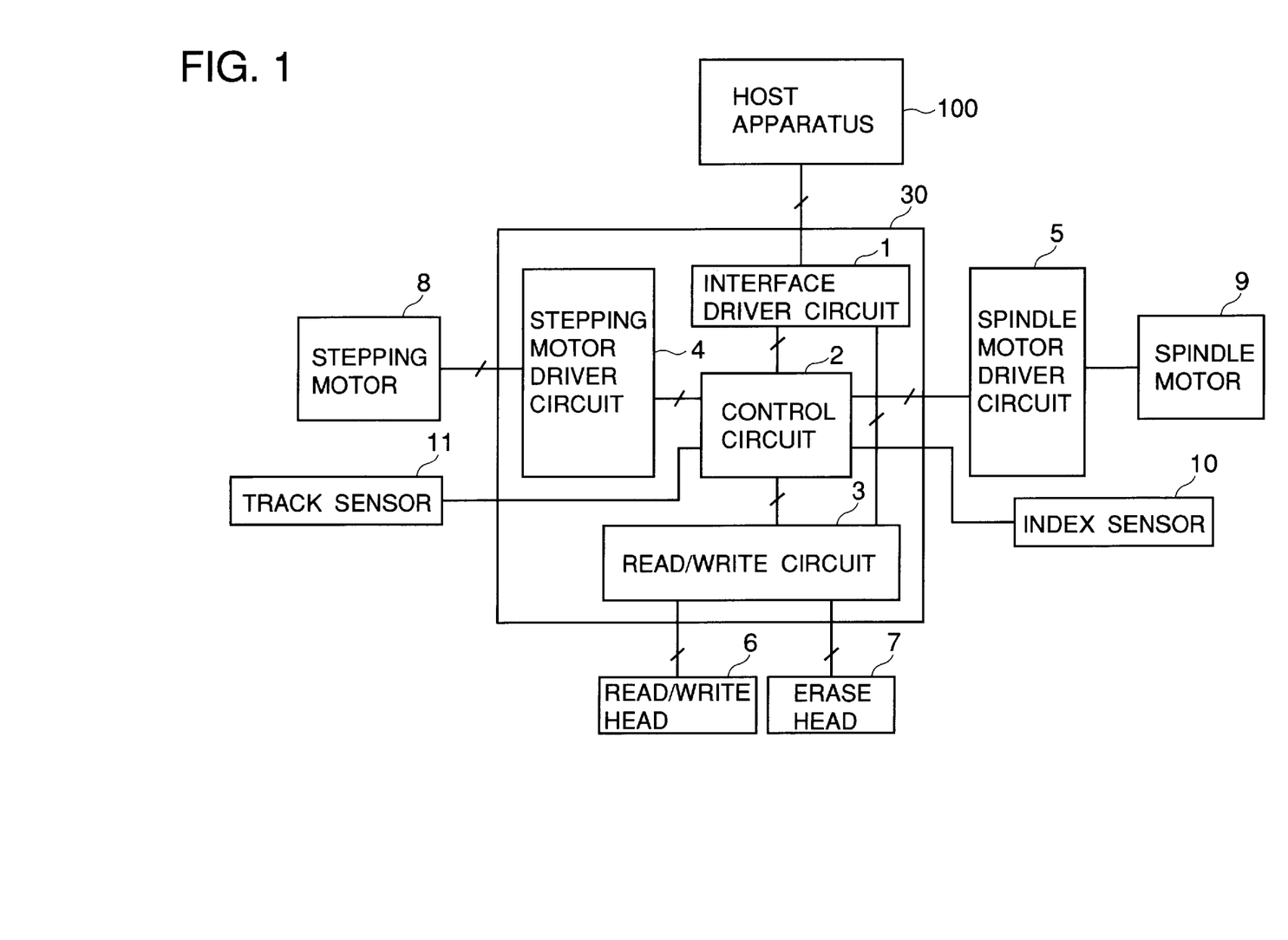
FIG. 1 is a block diagram showing the configuration of the signal handling system of an FDD apparatus to which the present invention is applied.

FIG. 1 shows a block diagram of an FDD (floppy disk drive) apparatus to which the present invention is applied. As shown in FIG. 1, the FDD apparatus includes an interface driver circuit 1, a control circuit 2, a read/write circuit 3, a stepping motor driver circuit 4, a spindle motor driver circuit 5, a read/write head 6, an erase head 7, a stepping motor 8, a spindle motor 9, an index sensor 10, and a track sensor 11, and is connected to an external host apparatus 100 such as a personal computer. The interface driver circuit 1, control circuit 2, read/write circuit 3, and stepping motor driver circuit 4 are formed within a one-chip semiconductor integrated circuit device (hereafter referred to as the "FDD IC") 30.

The individual blocks shown in FIG. 1 operate as follows. The interface driver circuit 1 coordinates the data format and the transfer method of the data exchanged between the host apparatus 100 and the control circuit 2, and of the data exchanged between the host apparatus 100 and the read/write circuit 3, the latter including the data that is going to be written to a magnetic disk (not shown) and the data that has just be read from the magnetic disk.

The control circuit 2, in accordance with the data fed thereto from the host apparatus 100 through the interface driver circuit 1, controls the writing and reading of data to and from the magnetic disk. In exchange, the control circuit 2 feeds the data related to the operation status of the FDD apparatus to the host apparatus 100 through the interface driver circuit 1.

Under the control of the control circuit 2, the read/write circuit 3, during data writing, feeds the coils of the read/write head 6 (used to write and read data to and from the magnetic disk) and of the erase head 7 (used to erase data from the magnetic disk) with electric currents in accordance with the data fed from the host apparatus 100 through the interface driver circuit 1, and thereby writes the data to the magnetic disk. On the other hand, during data reading, the read/write circuit 3, on the basis of the voltage that appears in the coil of the read/write head 6 in accordance with the data recorded on the magnetic disk, reads the data from the magnetic disk, and feeds the obtained data to the host apparatus 100 through the interface driver circuit 1.

The stepping motor driver circuit 4, under the control of the control circuit 2, drives the stepping motor 8 to transport the read/write head 6 and the erase head 7 radially across the magnetic disk. The spindle motor driver circuit 5, under the control of the control circuit 2, drives the spindle motor 9 to rotate the magnetic disk.

The index sensor 10 detects whether the magnetic disk is rotating normally or not, and the track sensor 11 detects whether the read/write head 6 and the erase head 7 are positioned at the outermost edge of the magnetic disk or not. Note that FIG. 1, described above, shows only the signal handling system, and not the power supply system. In contrast, FIG. 2 shows the power supply system of the FDD IC 30.

Figure 2:
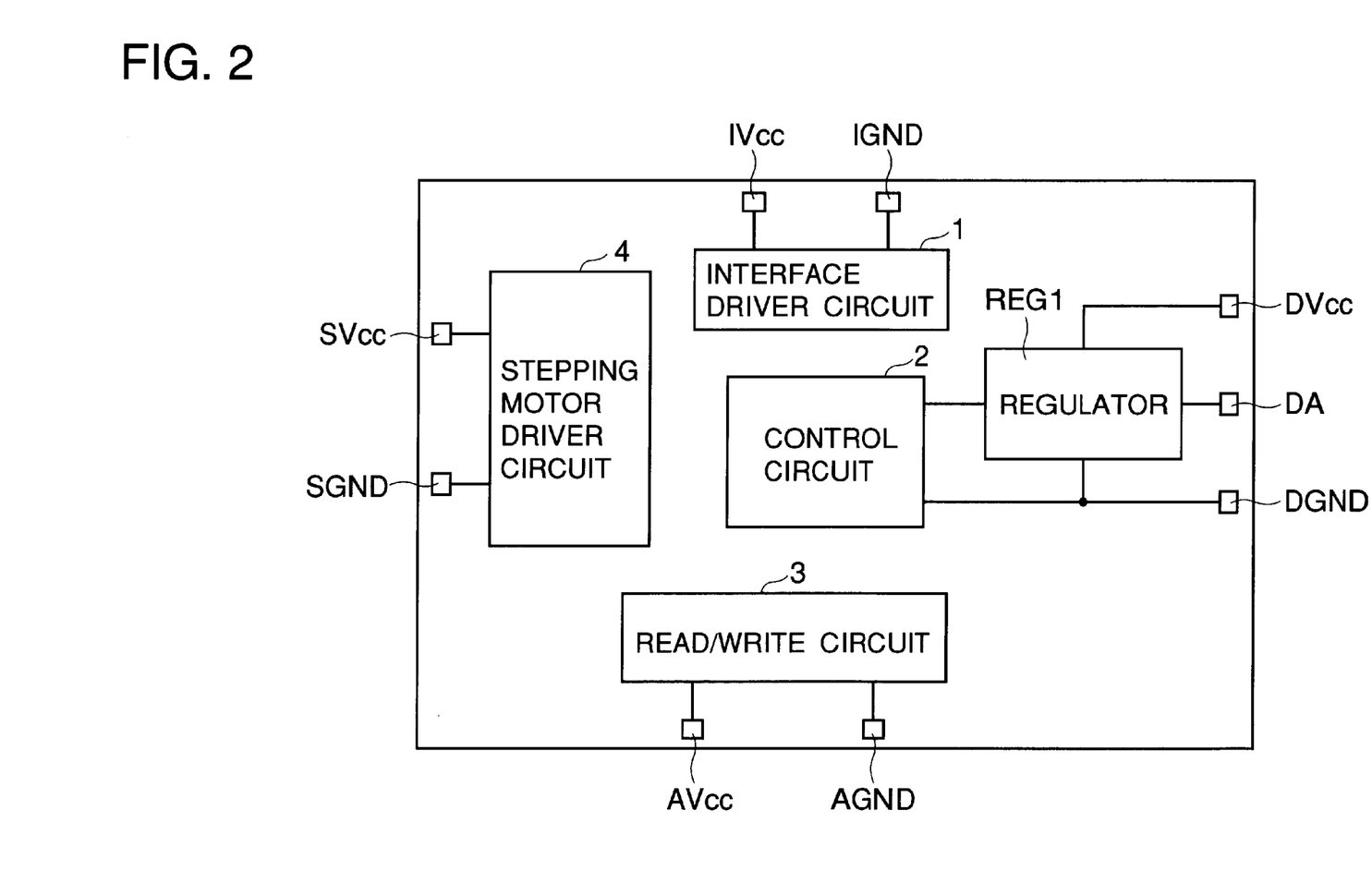
FIG. 2 is a diagram showing the configuration of the power supply system of the FDD IC employed in the FDD apparatus of a first embodiment of the invention.
Figure 3:
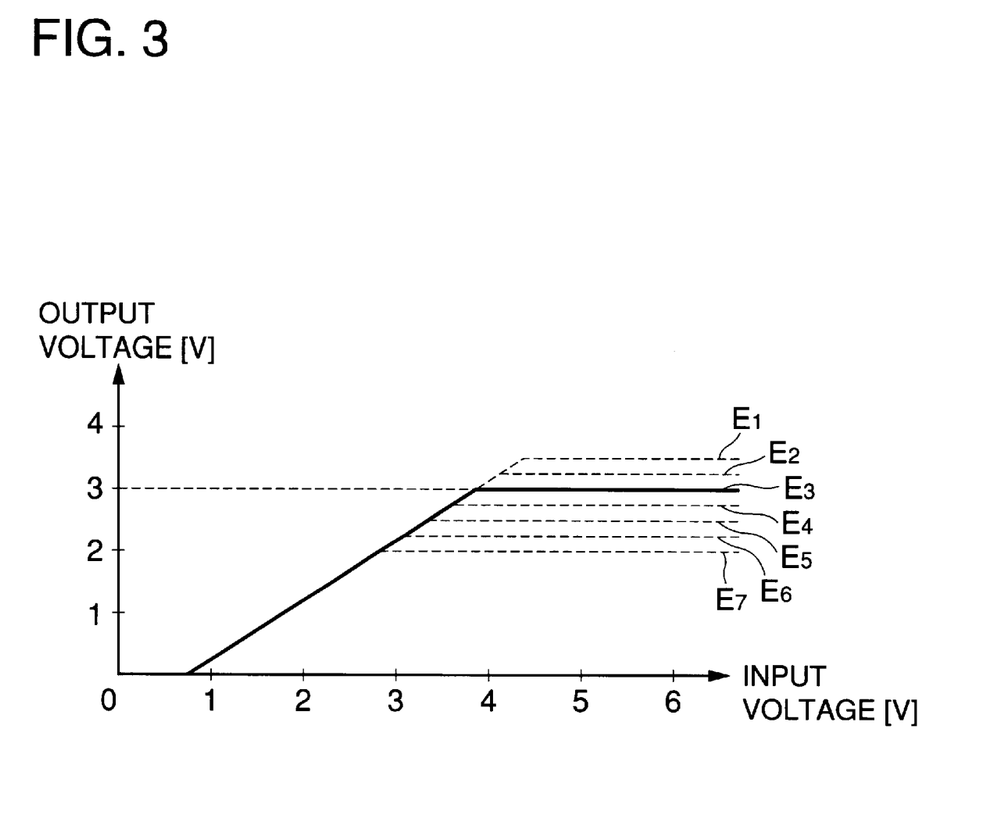
FIG. 3 is a diagram showing the input/output voltage characteristic of the regulator shown in FIG. 2.

In FIG. 2, REG1 represents a regulator, which exhibits an input/output voltage characteristic as shown in FIG. 3. This regulator REG1 produces, from the supply voltage fed thereto via a supply voltage terminal $DV_{CC}$, a stable output voltage that is lower than the supply voltage, which equals 5V here. The output voltage of the regulator REG1 is variable in seven steps $E_1$ to $E_7$ according to the voltage applied to an output voltage adjustment terminal DA. The control circuit 2 operates on the output voltage of the regulator REG1.

In this embodiment, the supply voltage terminal $DV_{CC}$ is connected to the supply voltage of 5V; that is, the input voltage to the regulator REG1 equals 5V. Normally, the voltage applied to the output voltage adjustment terminal DA is so adjusted that the output voltage of the regulator REG1 equals to 3V ($E_3$ in FIG. 3); that is, the control circuit 2 operates on 3V. The control circuit 2 and the regulator REG1 share a common ground terminal DGND.

Figure 4:
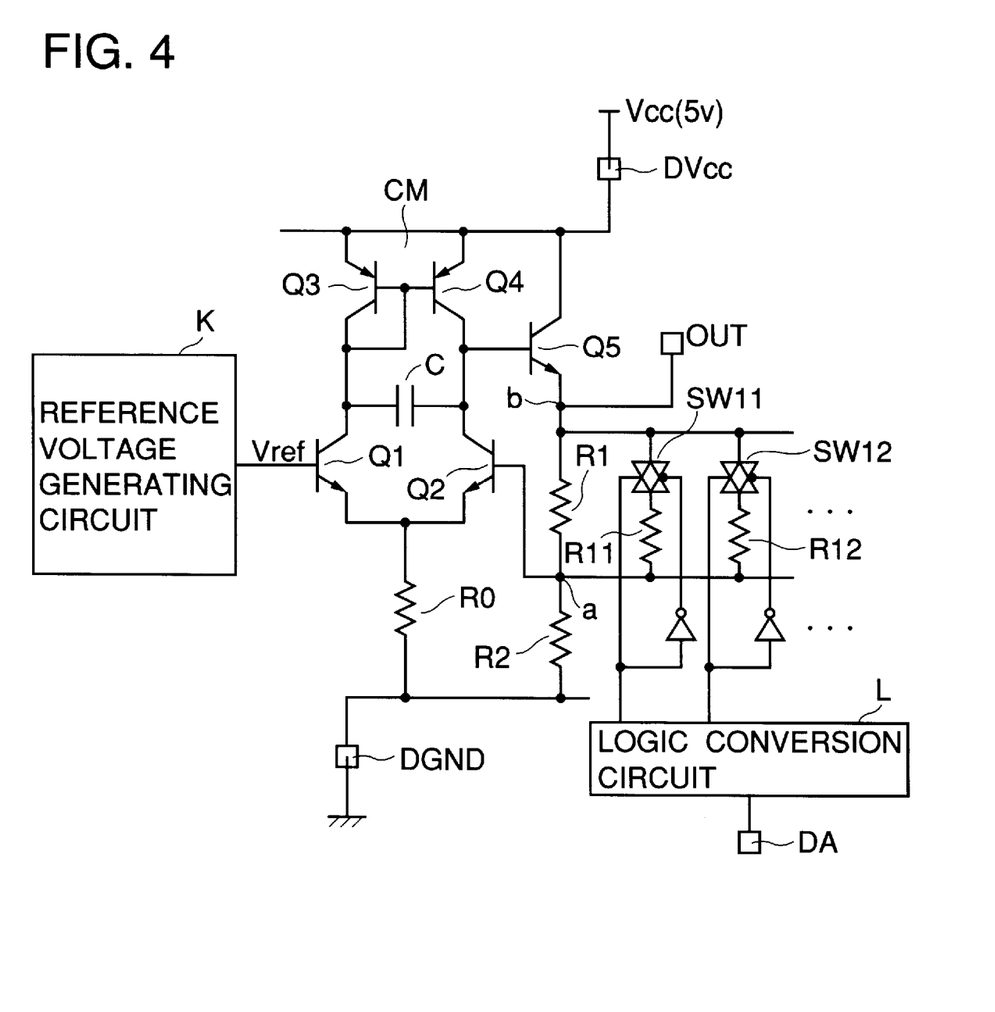
FIG. 4 is a circuit diagram showing an example of the configuration of the regulator shown in FIG. 2.

FIG. 4 shows an example of the configuration of the regulator REG1. As shown in this figure, two npn-type transistors Q1 and Q2 form a differential pair, with their emitters connected through a resistor R0 to the ground terminal DGND. The collectors of the transistors Q1 and Q2 are connected to the input and output sides, respectively, of a current mirror circuit CM formed by two pnp-type transistors Q3 and Q4. The collectors of the transistors Q1 and Q2 are also connected to each other through a capacitor C. The emitters of the transistors Q3 and Q4 are connected to the supply voltage terminal $DV_{CC}$, to which the supply voltage $V_{CC}$ is supplied.

The transistor Q5 has its collector connected to the supply voltage terminal $DV_{CC}$, has its emitter connected through two serially connected resistors R1 and R2 to the ground terminal DGND, and has its base connected to the collectors of the transistors Q2 and Q4. The transistor Q1 has its base connected to the output of a reference voltage generating circuit K that outputs a constant voltage $V_{ref}$. The transistor Q2 has its base connected to the node a between the two serially connected resistors R1 and R2. The node b between the emitter of the emitter follower transistor Q5 and the resistor R1 is connected to an output terminal OUT.

In parallel with the resistor R1 are connected an analog switch SW11 and a resistor R11 connected in series, and also an analog switch SW12 and a resistor R12 connected in series. The voltage applied to the output voltage adjustment terminal DA is fed through a logic conversion circuit L to those analog switches SW11 and SW12 so that the analog switches SW11 and SW12 are turned on and off in an appropriate manner. Although only two pairs of an analog switch and a resistor are shown in FIG. 3, the number of such pairs provided actually may be three or more.

Having the above-described configuration, the regulator REG1 of the first embodiment, by applying the voltage at the node a to the base of the transistor Q2, controls its output voltage on a feedback basis, and operates in such a way that the output voltage equals $(R_1+R_2) \times V_{ref}/R_2$ when all of the analog switches SW11, SW12, . . . are off, equals $(R_1/2+R_2) \times V_{ref}/R_2$ when one analog switch is on and all the other analog switches are off, equals $(R_1/3+R_2) \times V_{ref}/R_2$ when two analog switches are on and all the other analog switches are off, and so forth (here it is assumed that the resistors R1 and R2 have resistances $R_1$ and $R_2$, respectively, that the resistors R11 and R12 each have a resistance $R_1$, and that the on-state resistance of the analog switches is negligible). Thus, the regulator REG1 outputs a stable output voltage that is variable in a predetermined number of steps according to the on/off state of the analog switches SW11, SW12, . . . , i.e. the voltage applied to the output voltage adjustment terminal DA. In other words, whereas the voltage at the node a is equal to the reference voltage Vref, the voltage at the node b (and thus the voltage at the output terminal OUT) varies according to how many out of the resistors R1, R11, R12, . . . is in an active state.

Figure 5:
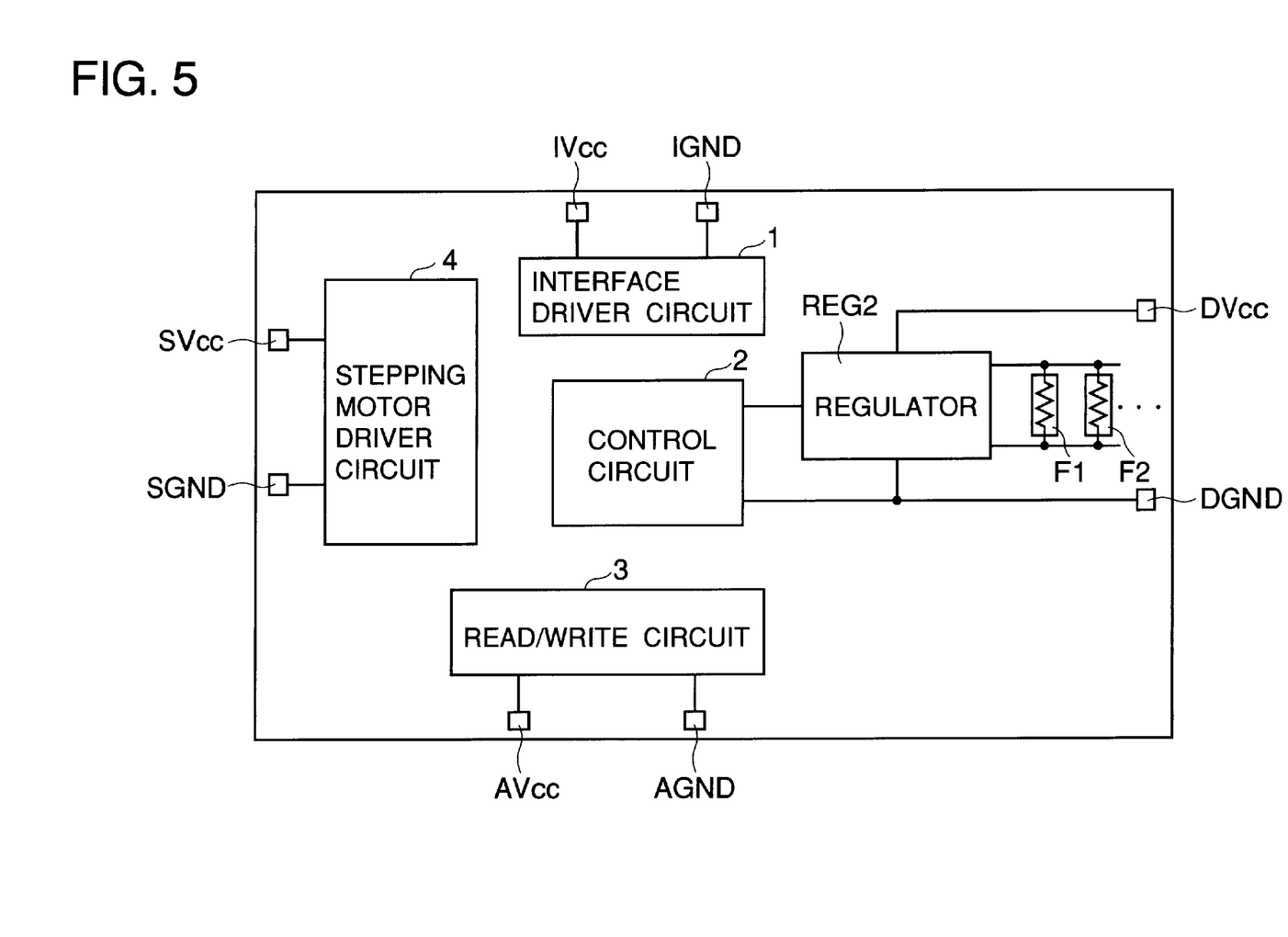
FIG. 5 is a diagram showing the configuration of the power supply system of the FDD IC employed in the FDD apparatus of a second embodiment of the invention.

FIG. 5 shows the configuration of the power supply system of the FDD IC employed in the FDD apparatus of a second embodiment of the invention. Note that, in the following descriptions, such elements as are shown also in FIG. 2 will be identified with the same reference numerals and symbols, and overlapping explanations will not be repeated. Note also that the block diagram shown in FIG. 1 applies also to the FDD apparatus of this embodiment.

Figure 6:
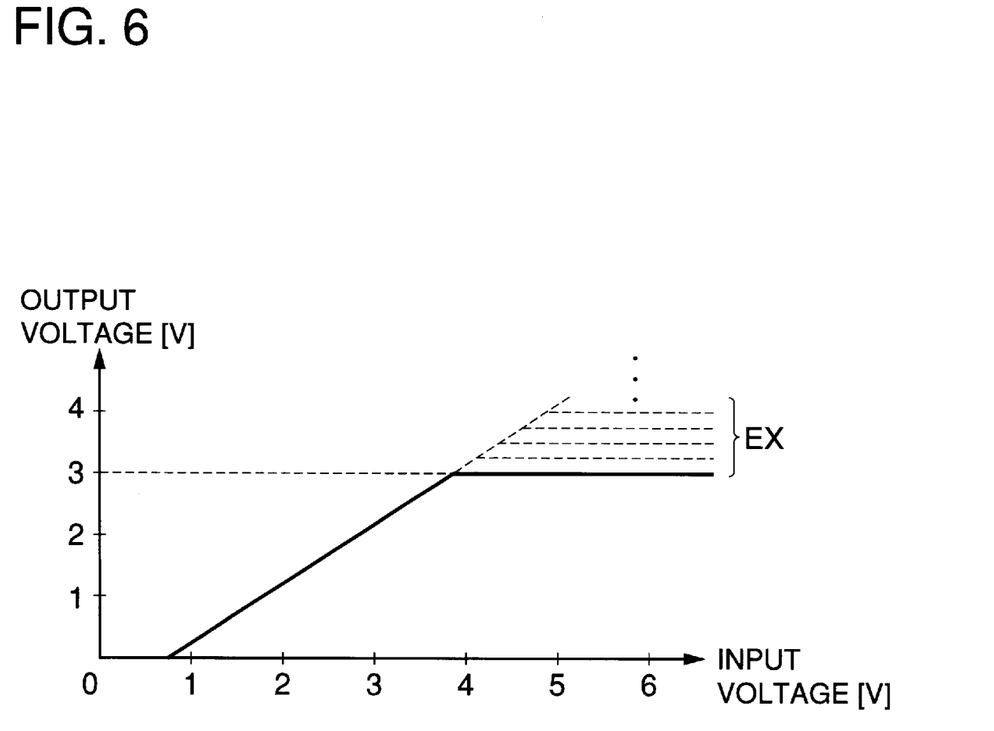
FIG. 6 is a diagram showing the input/output voltage characteristic of the regulator shown in FIG. 5.

In FIG. 5, REG2 represents a regulator, which exhibits an input/output voltage characteristic as shown in FIG. 6. This regulator REG2 produces, from the supply voltage fed thereto via a supply voltage terminal $DV_{CC}$, a stable output voltage that is lower than the supply voltage, which equals 5V here. The output voltage of the regulator REG2 is variable as indicated at EX in FIG. 6 according to how many fuses (or resistors) F1, F2, . . . are "laser-cut" (i.e. blown off by a laser beam). The control circuit 2 operates on the output voltage of the regulator REG2.

In this embodiment, the supply voltage terminal $DV_{CC}$ is connected to the supply voltage of 5V; that is, the input voltage to the regulator REG2 equals 5V. The regulator REG2 is so configured that, as long as the input voltage is around or above 5V, its output voltage equals 3V when all the fuses F1, F2, . . . are in a functioning state (i.e. not laser-cut). The control circuit 2 and the regulator REG2 share a common ground terminal DGND.

Figure 7:
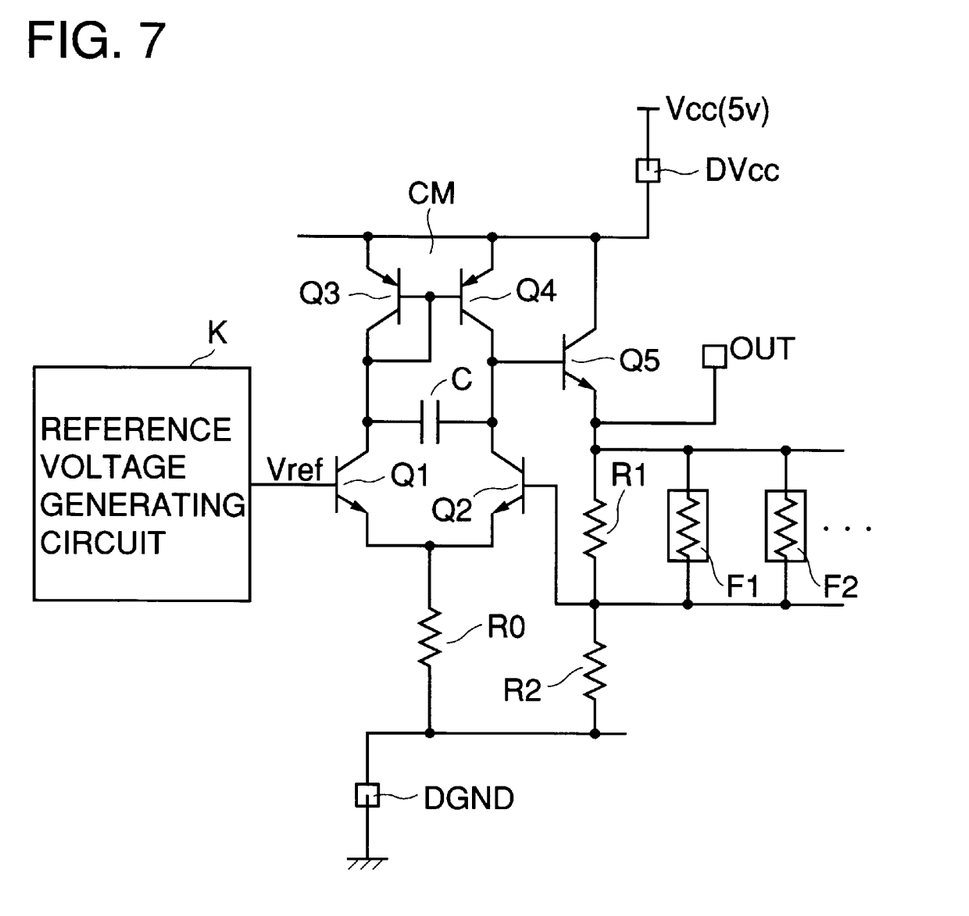
FIG. 7 is a circuit diagram showing an example of the configuration of the regulator shown in FIG. 5.

FIG. 7 shows an example of the configuration of the regulator REG2. Note that, in the following descriptions, such elements as are shown also in FIG. 4 will be identified with the same reference numerals and symbols, and overlapping explanations will not be repeated. The fuses F1, F2, . . . are connected in parallel with the resistor R1, and are arranged in such positions where they can be laser-cut.

Having the above-described configuration, the regulator REG2 controls its output voltage on a feedback basis, and operates in such a way that the output voltage equals $(R_1+R_2) \times V_{ref}/R_2$ when all of the fuses F1, F2, . . . are laser-cut, equals $(R_1/2+R_2) \times V_{ref}/R_2$ when all of the fuses except one are laser-cut, equals $(R_1/3+R_2) \times V_{ref}/R_2$ when all of the fuses except two are laser-cut, and so forth (here it is assumed that the resistors R1 and R2 have resistances $R_1$ and $R_2$, respectively, and that the fuses F1, F2, . . . each have a resistance $R_1$). Thus, the regulator REG2 outputs a stable output voltage that is variable in a predetermined number of steps according to how many out of the fuses F1, F2, . . . are laser-cut.

As described above, in the FDD apparatus of the first or second embodiment, a regulator REG1 or REG2 is provided between the control circuit 2 and the supply voltage line, and therefore there remains no path through which the noise resulting from the operation of the control circuit 2 contaminates the supply voltage. This helps suppress variation of the voltage that is supplied to analog circuits such as the read/write circuit 3 for their operation. In this way, it is possible to suppress the degradation of the characteristics of the read/write circuit 3, and thereby enhance the accuracy with which the FDD apparatus as a whole writes and reads data to and from a magnetic disk.

Moreover, in these embodiments, the control circuit 2, which conventionally operates directly on the supply voltage (5V), operates on a voltage (3V) lower than that. This helps reduce current consumption.

Since operating a circuit composed of MOS devices on a voltage lower than its normal operation voltage is equivalent to operating it in a high-temperature environment, if, in the FDD IC of the first embodiment described above, the control circuit 2 is composed of MOS devices, it is possible to conduct a high-temperature test simply by adjusting the voltage applied to the output voltage adjusting terminal DA so that the regulator REG1 outputs a voltage lower than its normal output voltage of 3V. This eliminates the need for a high-temperature environment, and thus helps simplify testing facilities and equipment and also reduce testing time. As a result, it is possible to reduce the testing costs of the FDD IC, and thereby reduce the costs of the FDD IC as a whole, and thus the costs of the FDD apparatus employing it.

Moreover, since a circuit that is composed of MOS devices of poor performance and thus does not offer the desired characteristics can sometimes be made to offer the desired characteristics by raising its operation voltage (hereafter such a circuit will be referred to as a "deficient-by-variation-in-characteristics circuit"), if, in the FDD IC of the second embodiment described above, the control circuit 2 is composed of MOS devices, it is possible to save such deficient-by-variation-in-characteristics circuits simply by raising the output voltage of the regulator REG2 by adjusting the number of fuses that are laser-cut (specifically, one fuse is laser-cut after another until the desired characteristics are obtained). This helps achieve a satisfactory yield of the FDD IC. As a result, it is possible to reduce the costs of the FDD IC, and thus the costs of the FDD apparatus employing it.

Note that, also in the first embodiment described above, it is possible to raise the output voltage of the regulator by adjusting the voltage applied to the output voltage adjustment terminal DA, and therefore it is possible to save deficient-by-variation-in-characteristics circuits. However, in contrast to the second embodiment, in which the output voltage of the regulator REG2 can be fixed at a higher voltage once an appropriate number of fuses F1, F2, . . . are laser-cut, in the first embodiment, to keep the output voltage of the regulator REG1 at a higher voltage, it is necessary to keep a corresponding voltage applied to the output voltage adjustment terminal DA. Thus, from the viewpoint of saving deficient-by-variation-in-characteristics circuits, the second embodiment is preferable.

It is possible to combine the first and second embodiments described above. In that case, first, the number of fuses F1, F2, . . . that are laser-cut is adjusted to save deficient-by-variation-in-characteristics circuits (specifically, the number of fuses F1, F2, . . . that are laser-cut is adjusted in such a way that the regulator outputs the lowest voltage that allows the desired characteristics to be obtained in the control circuit 2), and then the voltage applied to the output voltage adjustment terminal DA is adjusted to conduct a reliability test such as a high-temperature test. Since both embodiments are effective in achieving an increased yield of, and reduced testing costs of, the FDD IC, their combination helps further reduce the costs of the FDD apparatus.

Note that digital circuits designed for control purposes are expected simply to make correct judgments between a high level and a low level. This means that they do not necessarily have to be operated on a predetermined voltage; that is, they may be operated on a lower voltage, as long as a certain voltage margin is secured to ensure correct judgment between a high level and a low level. Accordingly, in the embodiments described above, a sufficient voltage margin can be secured in the control circuit 2 even if its operation voltage is reduced from conventional 5V to 3V.

Figure 8:
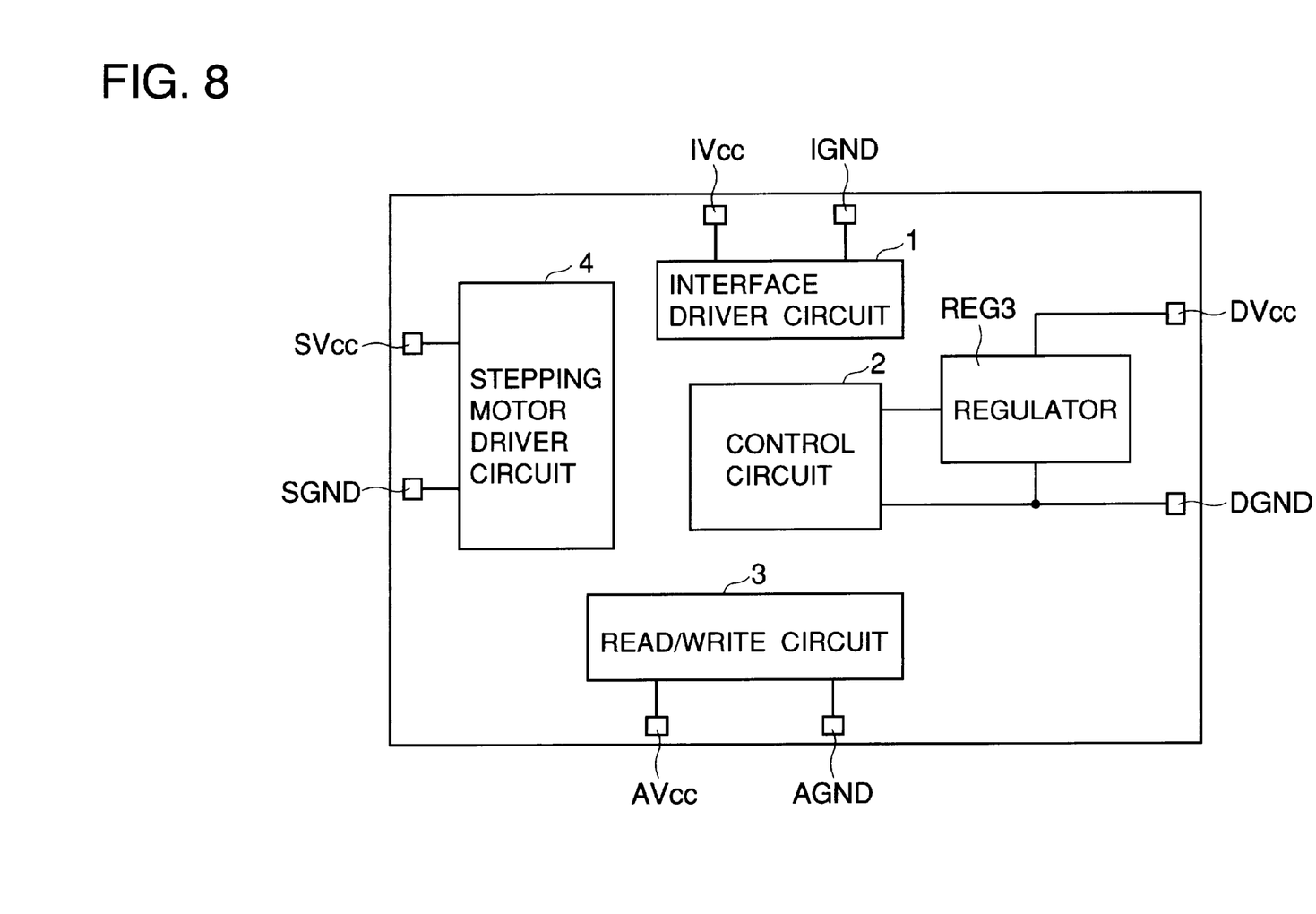
FIG. 8 is a diagram showing the configuration of the power supply system of the FDD IC employed in the FDD apparatus of a third embodiment of the invention.
Figure 9:
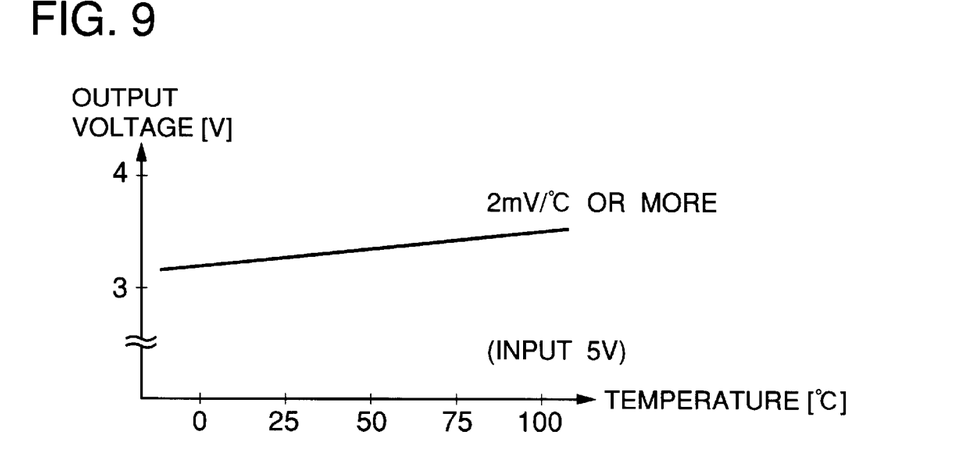
FIG. 9 is a diagram showing the temperature/output voltage characteristic of the regulator shown in FIG. 8.
Figure 10:
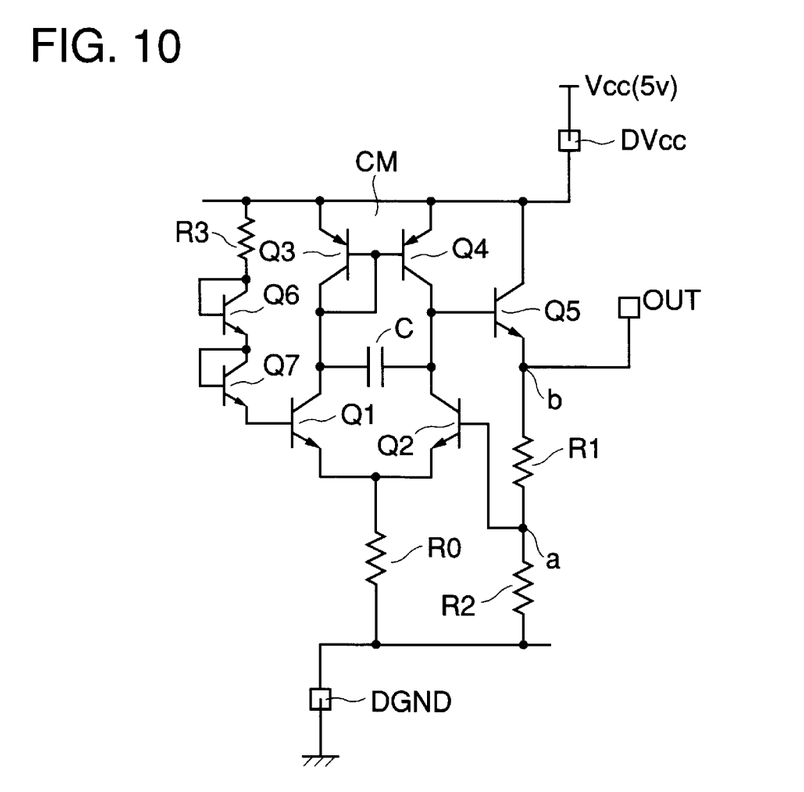
FIG. 10 is a circuit diagram showing an example of the configuration of the regulator shown in FIG. 8.

FIG. 5 shows the configuration of the power supply system of the FDD IC employed in the FDD apparatus of a third embodiment of the invention. Note that, in the following descriptions, such elements as are shown also in FIG. 2 will be identified with the same reference numerals and symbols, and overlapping explanations will not be repeated. FIG. 10 shows the configuration of the regulator REG3 employed in this embodiment. As shown in FIG. 10, two npn-type transistors Q1 and Q2 form a differential pair, with their emitters connected through a resistor R0 to a ground terminal DGND. The collectors of the transistors Q1 and Q2 are connected to the input and output sides, respectively, of a current mirror circuit CM formed by two pnp-type transistors Q3 and Q4. The collectors of the transistors Q1 and Q2 are also connected with each other through a capacitor C. The emitters of the transistors Q3 and Q4 are connected to a supply voltage terminal $DV_{CC}$.

The emitter follower transistor Q5 has its collector connected to the supply voltage terminal $DV_{CC}$, has its emitter connected through two serially connected resistors R1 and R2 to the ground terminal DGND, and has its base connected to the collectors of the transistors Q2 and Q4. The transistor Q1 has its base connected through two diode-connected npn-type transistors Q6 and Q7 and a resistor R3 to the supply voltage terminal $DV_{CC}$. The transistor Q2 has its base connected to the node a between the two serially connected resistors R1 and R2. The node b between the emitter of the transistor Q5 and the resistor R1 is connected to an output terminal OUT.

Having the above-described configuration, the regulator REG3 controls its output voltage on a feedback basis in such a way that the output voltage is fixed approximately at a voltage $(R_1+R_2) \times (V_{CC}-2V_F)$, where $V^F$ represents the forward voltage drop occurring in each of the transistors Q6 and Q7 and $V_{CC}$ represents the supply voltage. The higher the temperature of the transistors, the smaller the forward voltage drop occurring in them, and the lower the temperature, the larger the forward voltage drop. Accordingly, the output voltage of the regulator REG3 becomes higher according as temperature rises, and becomes lower according as temperature drops. In this way, by exploiting, for example, the temperature variation of the forward voltage drop in transistors, it is possible to make the output voltage of the regulator show a positive correlation with respect to temperature. Since the transistors Q6 and Q7 are diode-connected, they act substantially as diodes; accordingly, they may be replaced with diodes.

Also in the FDD apparatus of the third embodiment, as in the first and second embodiments, a regulator REG3 is provided between the control circuit 2 and the supply voltage line, and therefore there remains no path through which the noise resulting from the operation of the control circuit 2 contaminates the supply voltage. This helps suppress variation of the voltage that is supplied to analog circuits such as the read/write circuit 3 for their operation. In this way, it possible to suppress the degradation of the characteristics of the read/write circuit 3, and thereby enhance the accuracy with which the FDD apparatus as a whole writes and reads data to and from a magnetic disk.

In addition, the regulator REG3 is so configured that its output voltage shows a positive correlation with respect to temperature, and accordingly the operation voltage of the control circuit 2 becomes higher according as temperature rises. This helps cancel the degradation of the current capacity of MOS devices, and thus, in cases where the control circuit 2 is composed of MOS devices, helps improve the voltage margin secured in the control circuit 2. Since the control circuit 2 controls various circuits, by improving the voltage margin secured therein, it is possible to enhance the reliability of the FDD apparatus as a whole.

Moreover, if the regulator is so configured that its output voltage is variable, it is possible to eliminate malfunctioning of devices resulting from variation in their characteristics, and thereby further improve the voltage margin. Although the above descriptions of this embodiment deal only with a case where each circuit block has its own supply voltage terminal, it is also possible to provide only one terminal instead of providing the terminals $IV_{CC}$, $DV_{CC}$ and $SV_{CC}$ individually.

What is claimed is:

1. A magnetic disk apparatus comprising:

a magnetic head for writing and reading data to and from a magnetic disk;

position control means for controlling a position of said magnetic head;

a semiconductor integrated circuit device having a read/write circuit for processing a signal it communicates with said magnetic head, a drive circuit for driving said position control means, and a control circuit for controlling said read/write circuit and said driving circuit; and a regulator circuit, provided within said semiconductor integrated circuit device, whose output voltage is lower than a supply voltage, said control circuit operating on the output voltage of said regulator circuit.

2. A magnetic disk apparatus as claimed in claim 1, wherein said regulator circuit comprises:

a differential amplifier having a first and a second transistor of an npn type that are so connected as to form a differential pair;

an emitter follower for delivering an output of said differential amplifier to an output terminal;

a diode connected between a supply voltage terminal and a base of said first transistor so as to feed a base current to said first transistor;

a first and a second resistor connected in series between said output terminal and ground; and a conductor for connecting a node between said first and second resistors to a base of said second transistor.

3. A magnetic disk apparatus as claimed in claim 1, wherein said regulator circuit comprises:

a differential amplifier;

a reference voltage generating circuit for supplying a reference voltage to a first input terminal of said differential amplifier;

an emitter follower for feeding an output of said differential amplifier to an output terminal;

a first and a second resistor connected in series between said output terminal and ground;

a conductor for connecting a node between said first and second resistors to a second input terminal of said differential amplifier;

a plurality of resistors connected in parallel with said first resistor between said output terminal and said node; and means for determining which one or ones of said plurality of resistors to bring into an active state.

* * * * *